(12) United States Patent
Staggs

(10) Patent No.: US 6,889,995 B2
(45) Date of Patent: May 10, 2005

(54) HITCH LOCKING MECHANISM

(76) Inventor: Arnol Staggs, 1155 Lincoln, Wyandotte, MI (US) 48192

( * ) Notice: Subject to any disclaimer, the term of this patent is extended or adjusted under 35 U.S.C. 154(b) by 0 days.

(21) Appl. No.: 10/387,233

(22) Filed: Mar. 13, 2003

(65) Prior Publication Data

US 2004/0075240 A1 Apr. 22, 2004

Related U.S. Application Data

(60) Provisional application No. 60/419,070, filed on Oct. 17, 2002.

(51) Int. Cl.$^7$ ............................................... B61D 1/28
(52) U.S. Cl. ................................... 280/507; 280/511
(58) Field of Search ........................... 280/507, 512, 280/511, 514, 496.1, 496.5

(56) References Cited

U.S. PATENT DOCUMENTS

| | | | | | |
|---|---|---|---|---|---|
| 3,848,893 | A | * | 11/1974 | Patterson ................. | 280/416.3 |
| 4,379,569 | A | * | 4/1983 | Koch ....................... | 280/416.1 |
| 4,568,098 | A | * | 2/1986 | Landry, Jr. ................ | 280/416.1 |
| 4,758,015 | A | * | 7/1988 | Pixley ....................... | 280/504 |
| 4,844,498 | A | * | 7/1989 | Kerins et al. ............... | 280/504 |
| 4,938,496 | A | * | 7/1990 | Thomas et al. ............. | 280/511 |
| 4,989,892 | A | * | 2/1991 | Kerins et al. ............... | 280/504 |
| 5,106,114 | A | * | 4/1992 | Haupt ....................... | 280/416.1 |
| 5,290,057 | A | * | 3/1994 | Pellerito ..................... | 280/507 |
| 5,332,250 | A | * | 7/1994 | Thorwall et al. ........... | 280/507 |

* cited by examiner

*Primary Examiner*—Tony Winner
(74) *Attorney, Agent, or Firm*—Gerald R. Black

(57) ABSTRACT

A hitch locking mechanism enables secure retention of a towing vehicle to a towed vehicle. The hitch locking member comprises a shank and a clamp member. The clamp member includes a base, an arm, and a jaw. The jaw is pivotally attached to the base member, and moves relative to the arm between an upright position and an extended position. The shank is securely affixed to the clamp member at multiple points for secure retention of the towing vehicle to the towed vehicle. A first sleeve is positioned about the shank when the shank is retained to the clamp member. The first sleeve enables rotation of the shank relative to the clamp member when the shank is secured within the clamp member.

24 Claims, 12 Drawing Sheets

(Hitch)

(Clamp)

(Hitch)

(upright position)

(extended position)

(forward position)

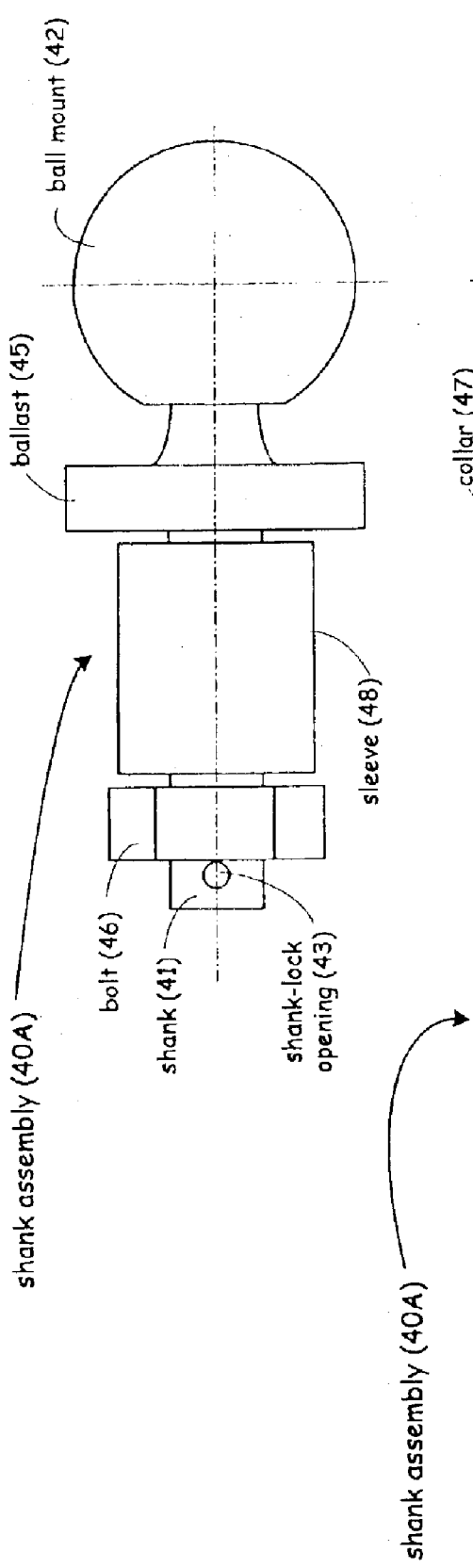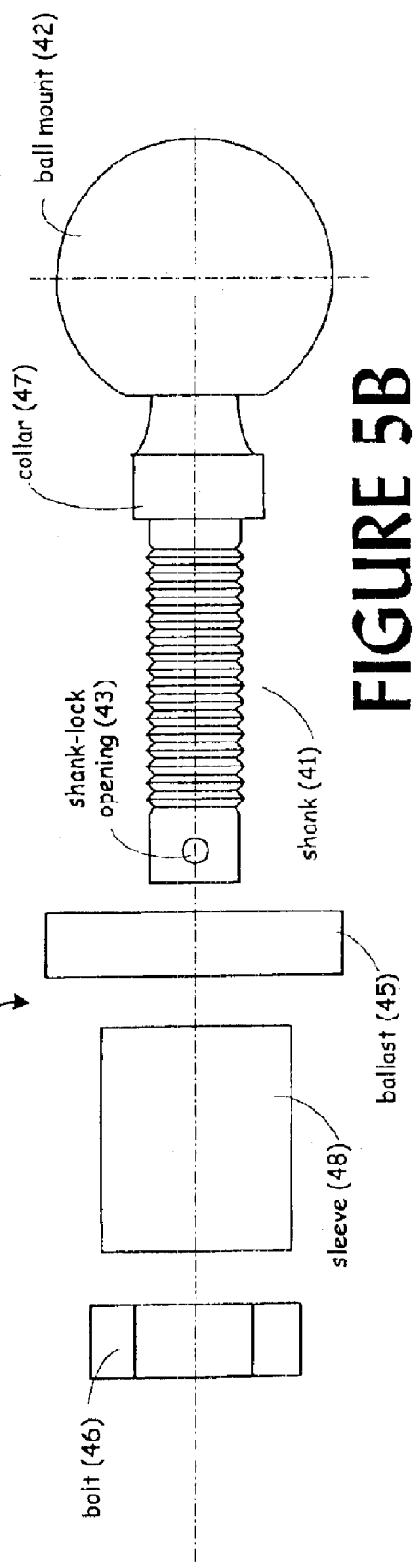

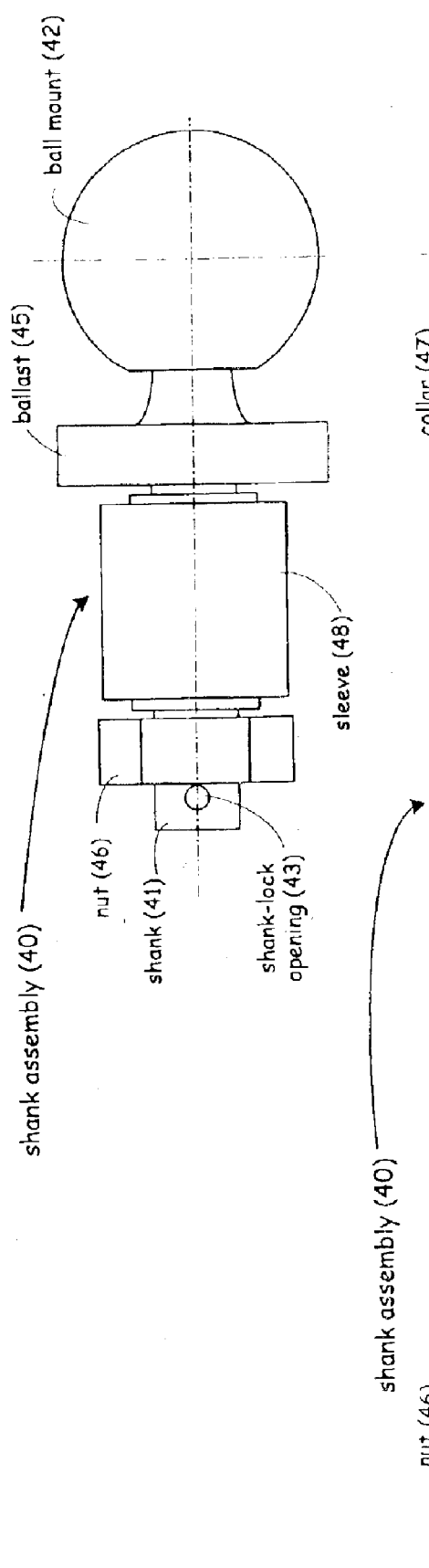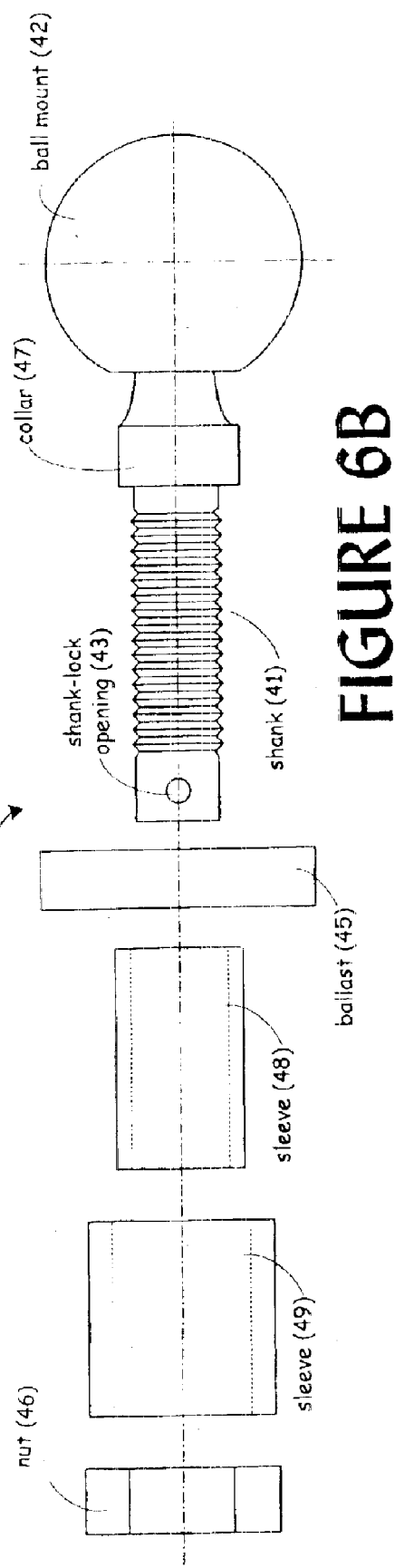

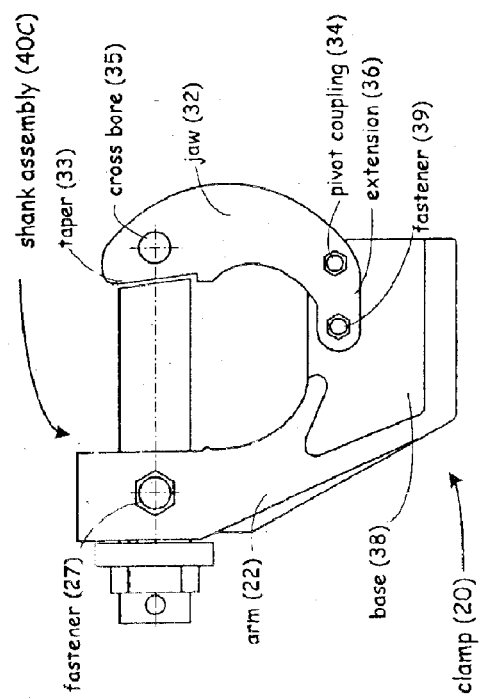
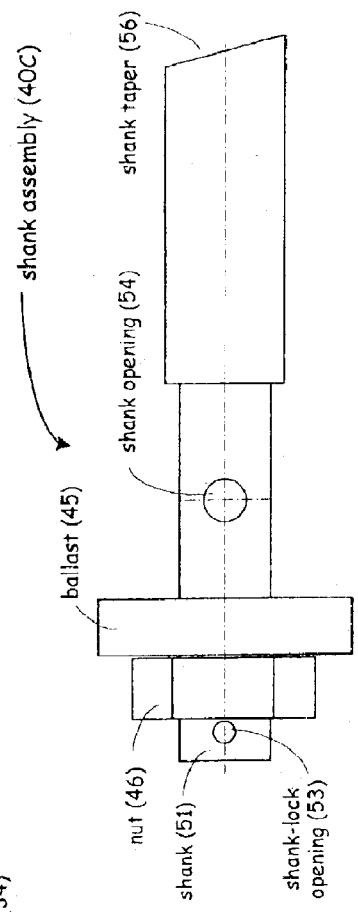
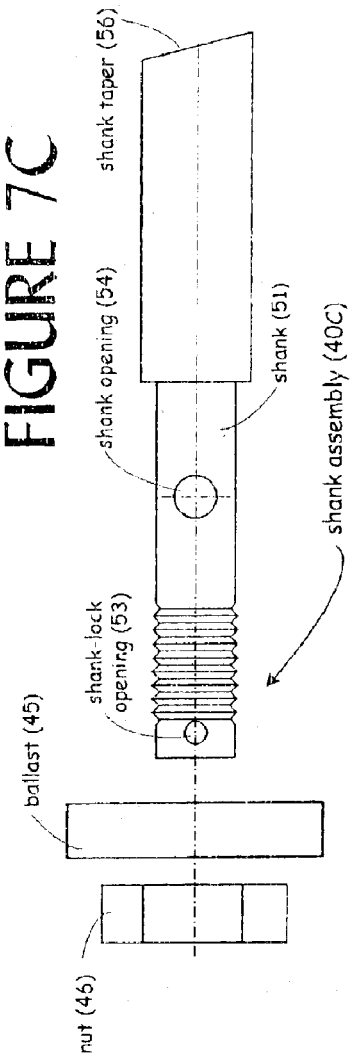
FIGURE 7A
FIGURE 7B
FIGURE 7C

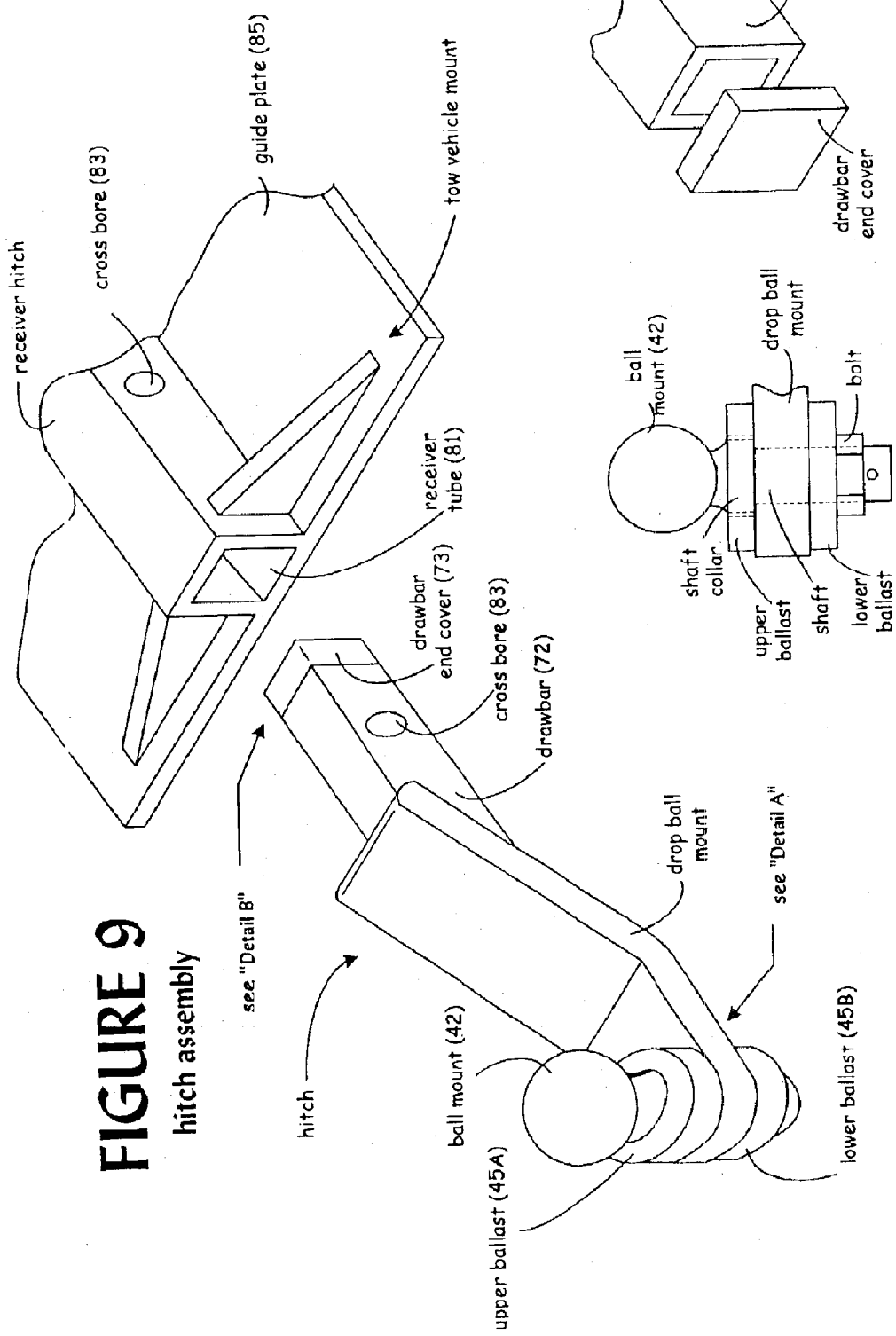

plunger switch armed plunger switch activated (plunger switch - armed condition)

HITCH LOCKING MECHANISM

This application claims the benefit of provisional application No. 60/419,070, filed Oct. 17, 2002.

FIELD OF USE

The present invention relates to hitch locking mechanisms, and more particularly, to a unique anti-theft mechanism that is adaptable to many different hitch locking applications.

BACKGROUND OF THE INVENTION

Trailers attached to pull vehicles are commonly used to transport machinery, livestock and other goods. When the trailer is unhitched from the pull vehicle, the trailer and its goods are subject to theft by undesired coupling to some other towing or pull vehicle.

Various locking mechanisms have been used for trailer hitches. One shortcoming of many of the conventional locking mechanisms is that they rely on an exposed padlock that can be cut quickly and easily by thieves using bolt cutters. One sharp blow with a hammer and chisel can also pop many padlocks open. All of such locking mechanisms are relatively easy to pry off of or out of the protected ball or socket component.

With the increase in towed leisure vehicles, many people have had the unpleasant experience of having a towed vehicle stolen from them. For example, many people go to the trouble and expense to have sturdy chains anchored in the ground and secure the chains to their towed vehicles by padlocks, only to discover that a thief can readily cut a padlock or chain of such an arrangement by using heavy-duty bolt-cutters, a hacksaw or other tool.

Various solutions have been proposed to indicate a secure trailer hitch connection and to alert the driver of the towing vehicle of a loose connection or of theft of the trailer.

U.S. Pat. No. 4,230,336 discloses an anti-theft ball for use with ball and socket hitches an externally threaded mounting bolt that engages an internally threaded central opening in the ball. A smaller diameter-locking bolt extends downwardly through a smaller diameter opening in the top of the ball and engages an internally threaded opening in the upper end of the mounting bolt. The threads on the mounting bolt have a different pitch than the threads on the locking bolt. The socket of the hitch prevents access to the locking bolt and the different pitches prevent the mounting bolt from being disengaged. Also, U.S. Pat. No. 5,087,064 discloses an anti-Theft and Safety Device for a Ball and Socket Trailer Hitch. The apparatus prevents the socket of such a hitch from being disconnected from the ball inadvertently or without the owners permission. But nothing was provided to protect the ball.

A conventional Pentel clamp is depicted in FIG. 1. The clamp includes a jaw pivotally attached to a base. A latch holds the jaw in place once the hitch is engaged. The latch has been known to yield under heavy loads and rough road conditions. In addition, the shaft often includes several ball mounts to accommodate varying load conditions. Also, the Pentel clamps also rated for various loads, and more than one clamp is generally needed.

However, these hitches will usually only accommodate trailers of certain sizes and not others. Accordingly, there is a need for an improved type of inexpensive and effective trailer hitch that is easy to assemble and install, that can safely accommodate different size vehicles and loads, that is compatible with various hitch designs, that provides improved wear. What is needed is a trailer hitch assembly, that is tamper-resistant to discourage theft of the towed vehicle or the hitch, and upon the unauthorized removal of the hitch from the towing vehicle, sounds a blatant alarm which either can or cannot be deactivated (design choice) by recoupling the hitch to the towing vehicle.

SUMMARY OF THE INVENTION

A hitch locking mechanism enables secure retention of a towing vehicle to a towed vehicle. The hitch locking member comprises a shank and a clamp. The clamp includes a base, an arm, and a jaw. The jaw is pivotally attached to the base member, and moves relative to the arm between an upright position and an, extended position. The shank is securely affixed to the clamp at multiple points for secure retention of the towing vehicle to the towed vehicle.

A first sleeve is positioned about the shank when the shank is retained to the clamp. The first sleeve enables rotation of the shank relative to the clamp when the shank is secured within the clamp.

A hitch locking mechanism is useful for securing a tow vehicle to a towing vehicle. The hitch locking mechanism comprises a shank, a clamp, and a sleeve. The shank enabling secure retention of a first shank end to a clamp, the shank being cooperatively engageable to a ball mount for attachment to a second shank end, the towed vehicle being attachable to the ball mount. The clamp includes a base and a jaw, the jaw having an upright position and an extended position relative to the base. The jaw is pivotally attached to a base when the clamp is in the upright position and in the extended position, the clamp including a passageway for secure retention of the first shank end. The jaw includes an opening for receiving a fastener, the fastener being engaged when the shank is securely retained to the base member in the upright position and the extended position. A sleeve is positioned about the shank when the shank is retained to the clamp. The sleeve enables rotation of the ball mount when the shank is secured within the clamp.

The preferred embodiment of the trailer hitch assembly of the present invention also includes an alarm unit. The trigger for the alarm unit is preferably a plunger switch that is initially armed when the hitch assembly is installed. Thereafter, the plunger switch is placed in an alarm status, which is used to detect removal of the hitch and/or the towed vehicle.

For a more complete understanding of the hitch locking mechanism of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention. Throughout the description, like reference numbers refer to the same component throughout the several views.

BRIEF DESCRIPTION OF THE DRAWINGS

FIGS. 5A and 5B disclose an assembly view of a first preferred embodiment of the shank assembly of the present invention for use with the clamping member of FIG. 2B;

FIGS. 6A and 6B disclose an assembly view of a second preferred embodiment of the shank assembly of the present invention for use with the clamping member of FIG. 2B, the shank assembly comprising a ball mount secured to a shank, a ballast member, an inner sleeve and an outer sleeve, and a retaining nut;

FIGS. 7A, 7B, and 7C disclose another embodiment of the hitch locking mechanism of the present invention, FIG. 7A depicting the shank assembly secured within the clamping member, FIGS. 7B and 7C depicting an assembly view of the shank assembly, the shank assembly comprising a shank with a taper at one shank end and a ballast member and a retaining nut at the opposing shank end;

FIGS. 8A and 8B depict a top view and a side view, respectively, of the shank for use in the hitch locking mechanism as depicted in FIG. 8C, the shank including an arm-shank mating opening and a jaw-shank mating opening;

FIG. 9 discloses still yet another preferred embodiment of the hitch locking mechanism of the present invention, the hitch locking mechanism comprising a shank assembly disposed within drop-ball mount, the drop-ball mount being secured to a backing plate, a drawbar extending from the backside of the drop ball mount, the drawbar cooperatively engaging into a receiver tube, the receiver tube being secured to a vehicle cross member;

DETAILED DESCRIPTION OF THE PREFERRED EMBODIMENTS

Figure 2B:
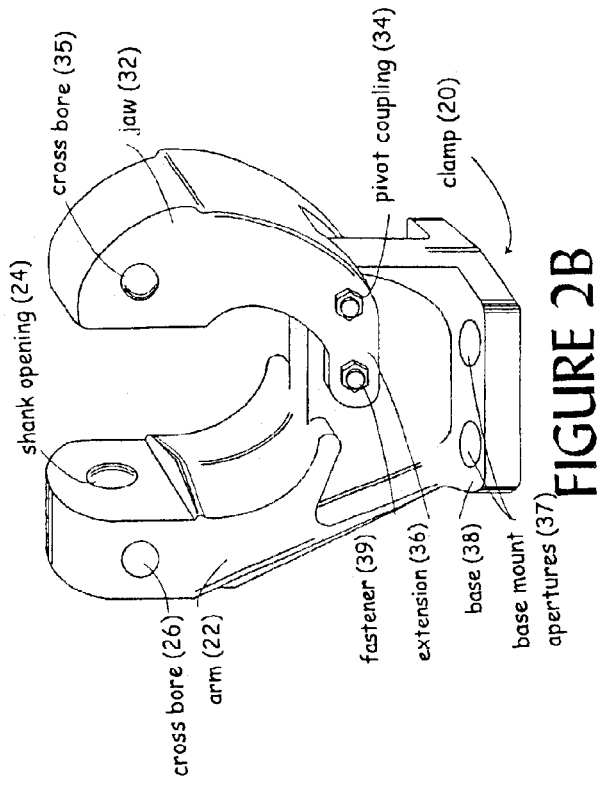
FIG. 2B discloses the clamping member of the embodiment shown in FIG. 2A, the clamping member including a base member and a jaw being pivotally secured to the base member (without the shank assembly)
Figure 2A:
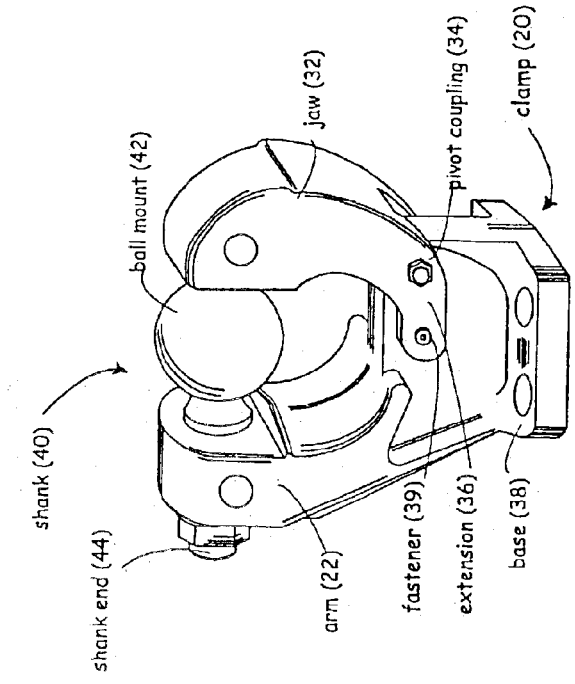
FIG. 2A discloses a first embodiment of a hitch-locking mechanism of the present invention, the hitch locking mechanism being a Pentel-type clamp comprising a base, a jaw, and an arm, a shank assembly being secured to the arm.

Referring now to the drawings, the preferred embodiment of the hitch locking mechanism of the present invention (10A) is disclosed in FIGS. 2A and 2B. As depicted in FIG. 2A, the first preferred embodiment of a hitch-locking mechanism of the present invention is a Pentel-type clamp (20) comprising a base (38), a jaw (32), and an arm (22), a shank assembly (40) being secured to the arm (22). FIG. 3 discloses the clamping member (20) without the shank assembly.

Figure 4A:
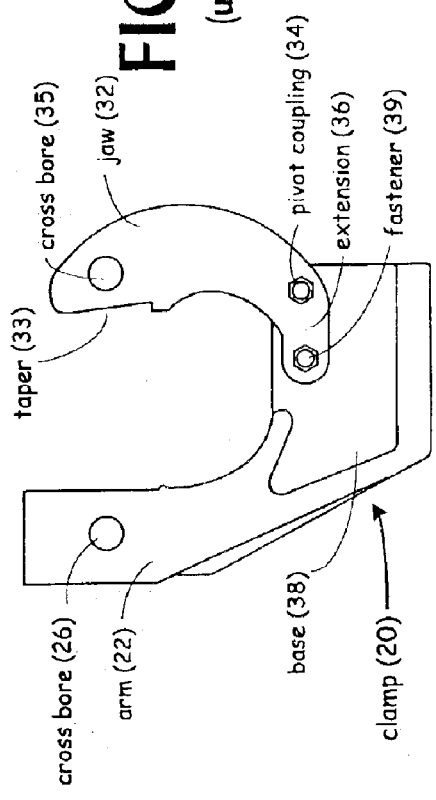
FIG. 4A discloses the clamping member of FIG. 2B in an upright position, FIG. 4B in a forward position, and FIG. 4C in an extended position.
Figure 4C:
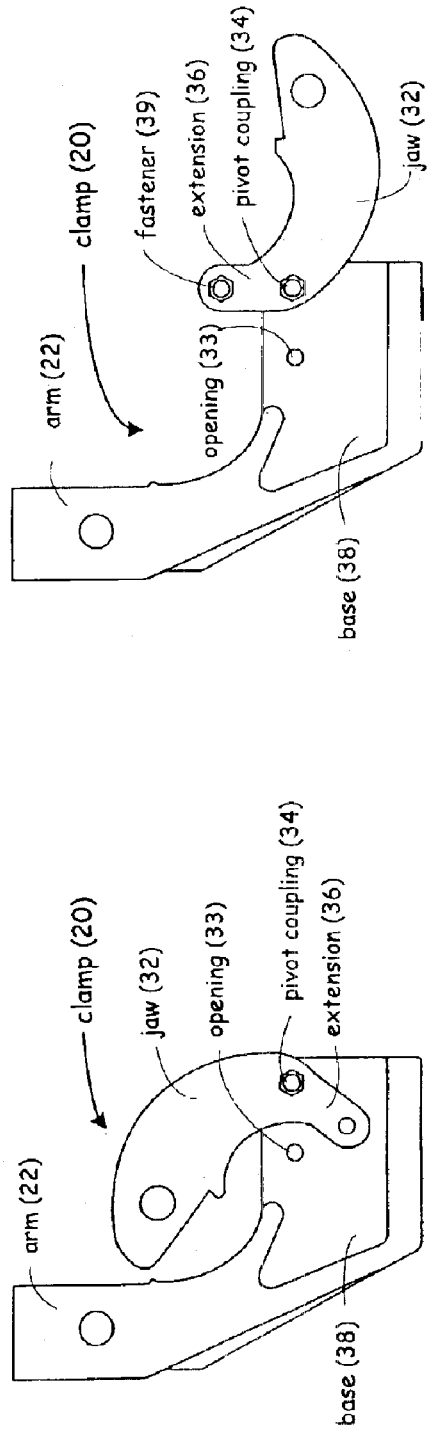
Figure 4B:
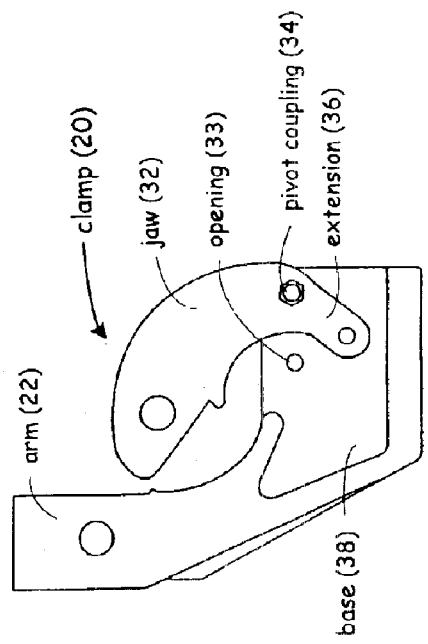

A hitch locking mechanism enables secure retention of a towing vehicle to a towed vehicle. The hitch-locking mechanism of FIG. 2A comprises a shank assembly (40A and a clamp (20). The clamp (20) is a modified Pentel-type clamp (20), and includes a base (38), an arm (22), and a jaw (32). The jaw (32) is pivotally attached to the base (38), and moves relative to the arm (22) between an upright position (see FIG. 4A) and an extended position (see FIG. 4C). The base (38) includes six openings (39) for secure retention to a mounting plate securely retained to the towing vehicle.

FIG. 2B discloses the clamping member of the preferred embodiment the hitch Locking mechanism of the present invention as shown in FIG. 2A. The clamp (20) is a modified Pentel-type hitch. The modifications include a cross bore in the arm (22) of the clamp (20) that passes through an engaged shank (41). The cross bore enables a shaft to be inserted and engaged with the arm (22) and the shaft, providing additional secure engagement of the shank (41) to the clamp (20). The jaw (32) is pivotally secured to the clamp (20) through a pivotal coupling (34). The jaw (32) also includes a jaw extension (36) extending therefrom. A pair of jaw extension fasteners (39) extending and passing through opening (33) in the base (38) of the clamp (20) reinforce and provide additional strength for the hitch (10A).

Figure 3A:
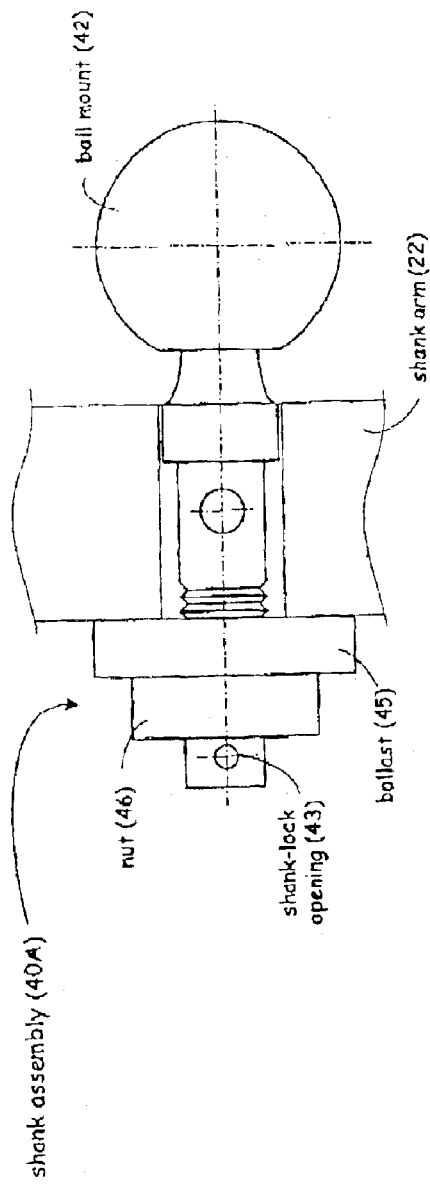
FIG. 3A discloses a preferred embodiment of the shank assembly of the present invention comprising a ball mount, a ballast, a nut, and a threaded shank, and FIG. 3B discloses another preferred embodiment of the shank assembly of the present invention comprising a ball mount, a ballast, a nut, and a threaded shank.

FIG. 3A discloses a preferred embodiment of the shank assembly (40A) of the present invention comprising a ball mount (42), a ballast (45), a threaded nut (46), and a threaded shank (41). A first opening is positioned at the end of the shank and a second opening is positioned between the ball mount (42) and the threaded portion of the threaded shank (41).

Figure 3B:
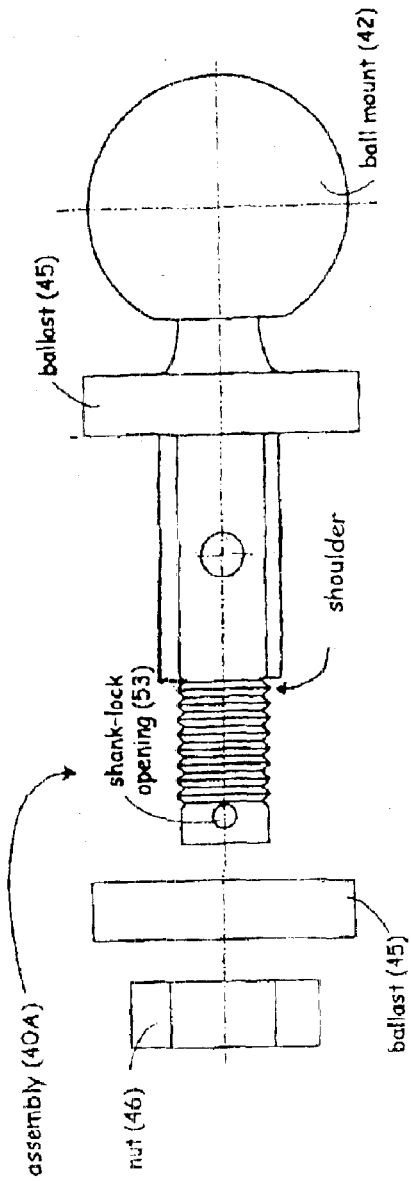

FIG. 3B discloses another preferred embodiment of the shank assembly (40A) of the present invention comprising a ball mount (42), a ballast (45), a threaded nut (46), and a threaded shank (41). A first opening is disposed at the end of the shank and a second opening is disposed between the ball mount and the threaded portion of the threaded shank (41). The portion of the threaded shank between the ball mount (42) and the threaded portion has a thickened shoulder that abuts the ballast (45) during engagement.

Figure 1:
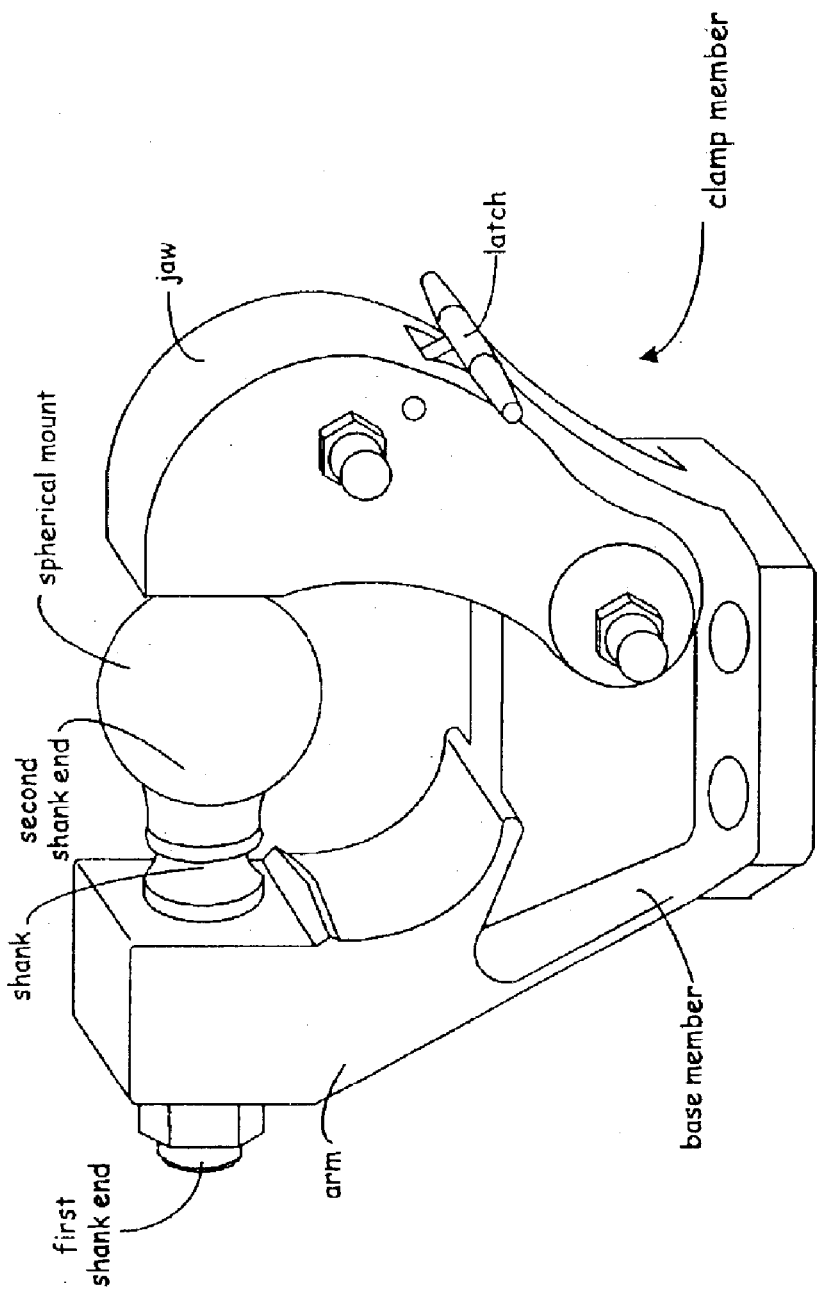
FIG. 1 discloses a hitch clamp mechanism (Pentel clamp) of the prior art.

While all of the shank assemblies disclosed herein are designed for the clamp (20), such shank assemblies are also compatible with the shank assembly shown in FIG. 1. Also, various ball mounts (42) can be secured to the shaft to accommodate smaller (about 1⅞" OD), medium (about 2" OD), or heavier loads (about 2 5/16" OD). As shown in the preferred embodiment of the shank assembly of FIGS. 11A and 11B, the shank assembly (40A) is preferably affixed to the clamp (20) at more than one point for purposes of stability of the towing vehicle to the towed vehicle. The shank assembly comprises a shank (41), a ballast (45), and a threaded nut (46). The shank (41) has a ball mount (42)

disposed at one end, a collar (47), a threaded body enabling cooperative engagement with the threaded nut (46), and a shank Lock opening (43) enabling secure engagement with a lock (not shown). The nut securely retains the shank assembly (40A) to the arm (22) of the clamp (20).

FIGS. 5A and 5B disclose an assembly view of another preferred embodiment of the shank assembly (40A) of the hitch locking mechanism (10A) of the present invention comprises a shank (41), a sleeve (48), a ballast (45), and a threaded retaining nut (46). The shank (41A) passes through a bore (24) disposed in the arm (22) of the clamp (20) along the longitudinal axis of the shank (41A). The arm (22) of the clamp (20) also includes a cross bore (26) enabling a shaft (not shown) to secure retention of the shank (41A) to the arm (22).

The hitch Locking mechanism of the present invention secures a tow vehicle to a towing vehicle. The hitch locking mechanism (10A) comprises a shank (51E), a clamp (20), and a sleeve. The shank (51E) enabling secure retention of a first shank end to a clamp (20), the shank (51E) being cooperatively engageable to a ball mount (42) for attachment to a second shank end, the towed vehicle being attachable to the ball mount (42). The clamp includes a base and a jaw (32), the jaw (32) having an upright position and an extended position relative to the base. The jaw (32) is pivotally attached to a base when the clamp (20) is in the upright position and in the extended position, the clamp (20) including a passageway for secure retention of the first shank end. The jaw (32) includes an opening for receiving a fastener, the fastener being engaged when the shank is securely retained to the base in the upright position and the extended position. A sleeve is positioned about the shank (51E) when the shank (51E) is retained to the clamp (20). The sleeve enables rotation of the ball mount (42) when the shank (51E) is secured within the clamp (20).

FIGS. 6A and 6B discloses an assembly view of yet another preferred embodiment of the shank assembly (40B) of the hitch locking mechanism (10A) of the present invention is shown. The shank assembly (40B) of comprises a shank (41B), an inner sleeve (48), an outer sleeve (49), a ballast (45), and a nut (46). The external diameter of the outer sleeve (49) fits in a snug manner into the shank opening (24). The external diameter of the inner sleeve (48) is slightly less than the internal diameter of the outer sleeve enabling a rotational movement of the inner sleeve relative to the outer sleeve. Again, this provides additional reinforcement foe the hitch mounting assembly (10A), while again improving wear properties of the ball mount (42). The outer sleeve has an internal diameter that is slightly larger than the external diameter of the shank (41B), enabling the free rotation of the sleeve relative to the shank (41B). This configuration improves wear of the ball mount (42), enabling the ball mount (42) to rotate within the clamp (20), without compromising secure retention of the hitch assembly relative to the towed vehicle. The sleeve combination enables rotation of the shank (41B) relative to the clamp (20) when the shank (41B) is secured within the clamp (20). The threaded nut (46) need only be hand tightened, so that the ball mount (42) can rotate within the sleeve providing more even wear of the ball mount (42).

FIGS. 7A and 7B disclose an assembly view of yet another preferred embodiment of a shank assembly (40C) of the hitch Locking mechanism of the present invention. The shank assembly (40C) comprises a shank (51), a ballast (45), and a threaded retaining nut (46). The towed vehicle is directly engaged to this shank (51). The shank (51) includes a shank taper (56) at one end that cooperatively engages with a jaw taper (57) having a similar grade to provide additional strength to the hitch locking mechanism of the present invention. The meshing engagement of the tapers (56 and 57) further secures the shank (51) to the clamp (20).

Figure 8A:
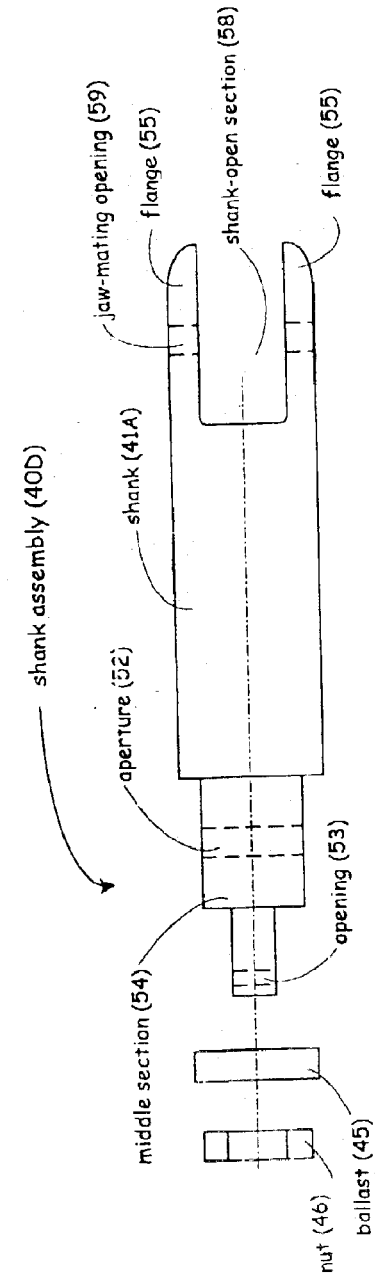
FIGS. 8A and 8B disclose a third preferred embodiment of a shank assembly for the hitch locking mechanism of the present invention (see FIG. 8C)
Figure 8B:
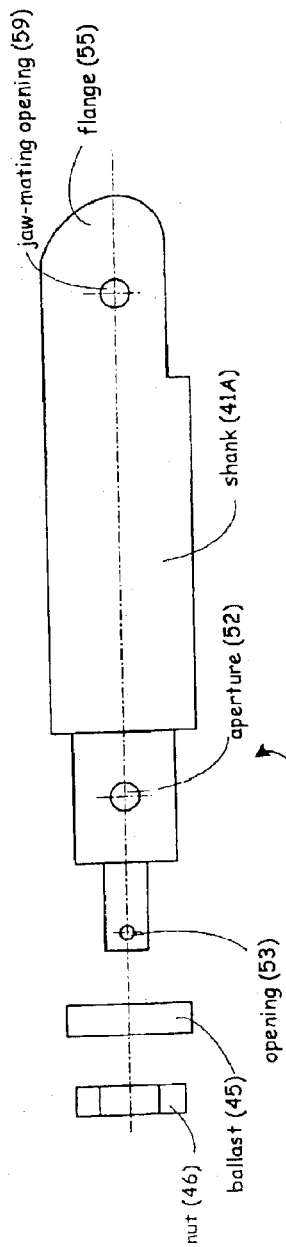

FIGS. 8A and 8B disclose an assembly view of still yet another preferred embodiment of a shank assembly (40C) of the hitch locking mechanism of the present invention. The shank assembly (40C) is useful for towing extra-heavy loads (as much as 10 to 20 tons) because of the multiple engagements between the shank (51C) and the clamp (20) including the cross bore fasteners (56 and 57) through the arm (22) and the jaw (32), respectively, and a matching taper between the shank (51C) and the jaw (32) not shown. The shank assembly (40C) comprises a shank (51C), a ballast (45), and a threaded retaining nut (46). The towed vehicle is directly engaged to this shank (51C).

Figure 8C:
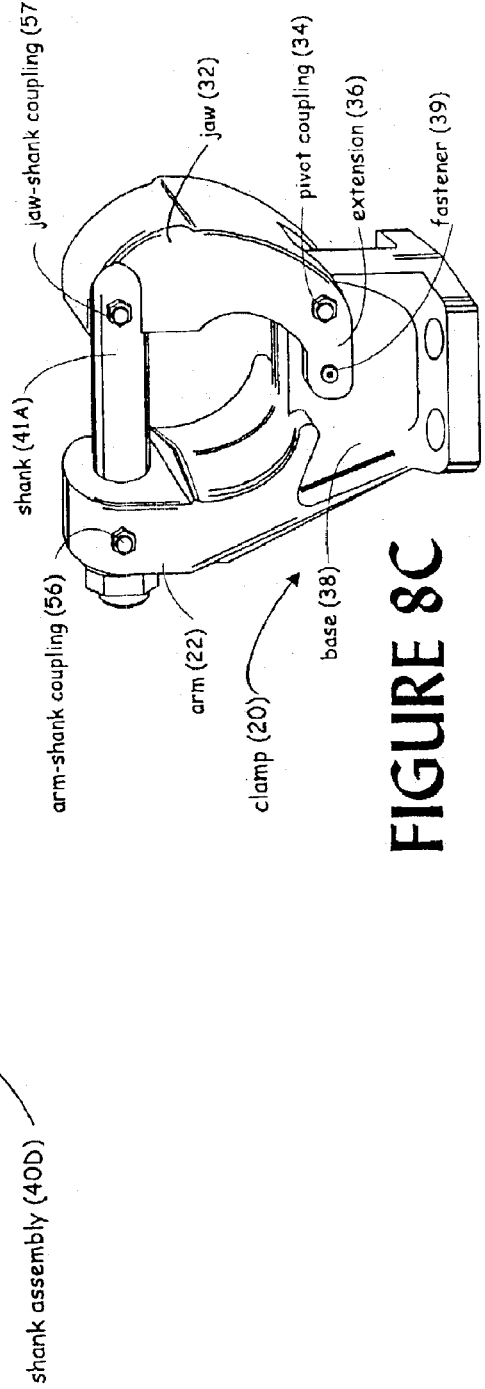

FIGS. 8A, 8B, and 8C disclose still another embodiment of the hitch Locking mechanism of the present invention. FIGS. 8A and 8B depicts a top view and a side view of the shank (51D), respectively, of the shank (51D) for use in the hitch Locking mechanism as depicted in FIG. 8C. An opening (43) is disposed at one end of the shank (51D) for engagement with a lock, an arm-mating opening (52) is disposed in the middle section (53) of the shank and a jaw-mating opening (59) is disposed at the other end of the shank (51D).

FIG. 9 discloses still yet another view of the hitch locking mechanism of the present invention. This embodiment shows how the principles of the shank embodiments can also be applied to a drawbar hitch (10B). The shank assembly (40C) comprises a shank (51D), an upper ballast (45), a lower ballast (45), and a threaded retaining nut (46). The towed vehicle is directly engaged to this shank (51D). Each of the ballasts (45) is positioned against opposing surfaces of the drop ball mount (76). The drawbar (72) is retained within a receiver tube (81), the receiver tube (81) being secured to the towing vehicle. The drop-ball mount (76) is secured to a backing plate (82), a drawbar (72) extending from the backside of the drop ball mount (76).

All balls (42) are interchangeable and can be substituted for various sizes depending upon load requirements with the hitch locking mechanism of the present invention. In addition, the sleeves and/or sleeve bearings (48 and 49) can be further employed to satisfy various loading requirements with existing an Pentel clamp or with the modified clamp of the present invention (20) as seen in FIGS. 2A and 2B.

Figure 10B:
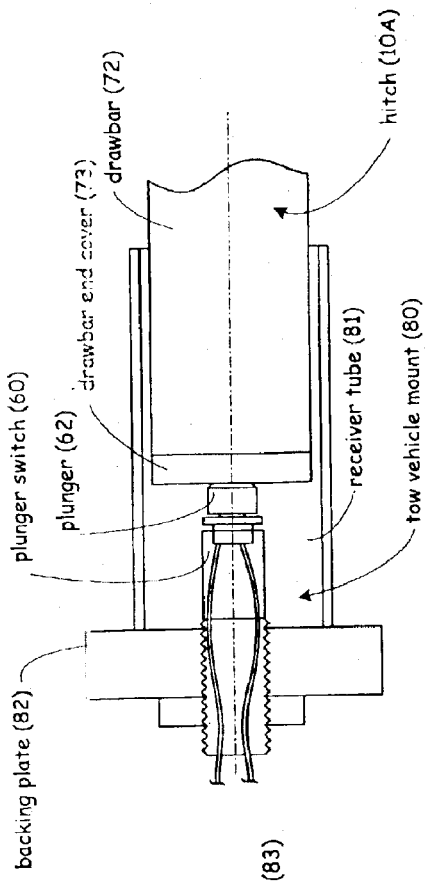
FIG. 10B discloses a first embodiment of a plunger switch assembly for use in receiver tube of the hitch locking mechanism of the present invention, the plunger switch assembly abutting the drawbar, the plunger switch assembly being in the armed condition, and FIG. 10C discloses the plunger switch in the activated condition.
Figure 10C:
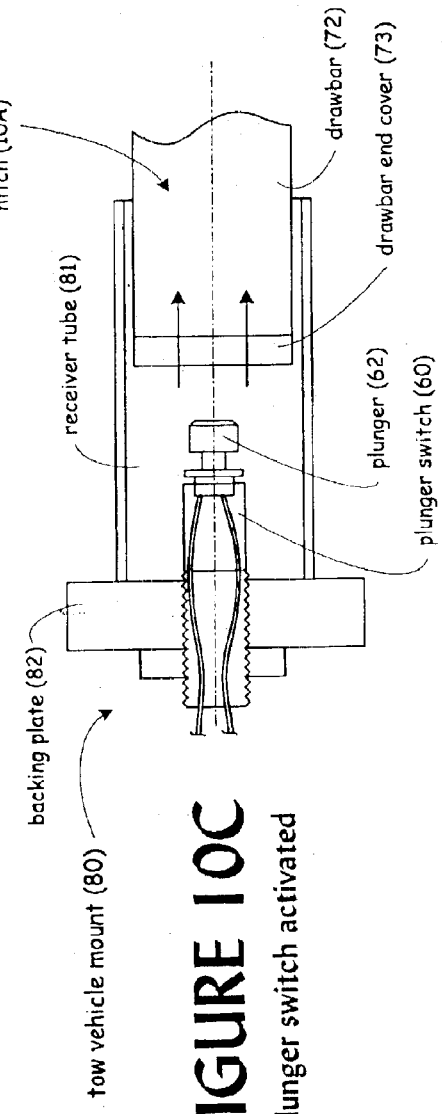
FIG. 10A discloses the hitch locking mechanism of FIG. 9, having a hitch alarm disposed inside the receiver tube and hidden from view when the drawbar is secured to the receiving tube.

The preferred embodiment of the hitch locking mechanism of the present invention includes an alarm unit. The trigger for the alarm unit is preferably a plunger switch (60) that is initially armed upon installation of the hitch locking mechanism. Thereafter, the plunger switch (60) is placed in an alarm status, and is used to detect removal of the hitch and/or the towed vehicle from the towing vehicle. FIGS. 10B and 10C depict a preferred embodiment of the alarm unit of the present invention with a hitch drawbar of FIG. 10A. FIGS. 11A and 11B depict the preferred embodiment of the alarm unit with a Pentel-type clamp of FIGS. 2A and 2B (or FIG. 1). FIG. 12B depicts a simplified preferred embodiment of an alarm unit of the present invention for use with a trailer hitch couple (such as the unit shown in FIG. 12A).

FIG. 10 discloses a refinement to the hitch locking mechanism of the present invention as shown in FIG. 9. The hitch Locking apparatus comprises a hitch mounting, a hitch drawbar (72), and an alarm positioned inside the hitch mounting. The hitch drawbar (72) is secured within a receiver tube (81) of the vehicle mounting in such a way as to be invisible when viewed from the outside of the assembly.

Figure 10A:
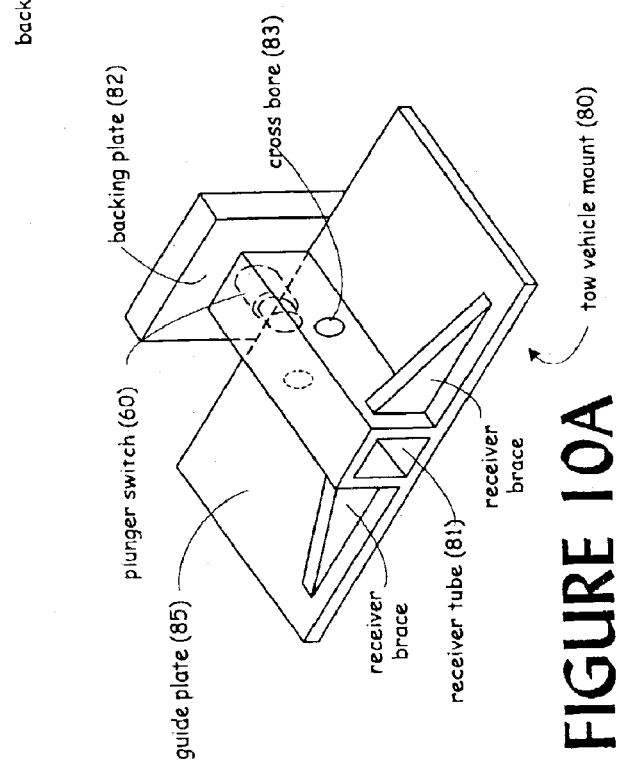
Figure 11A:
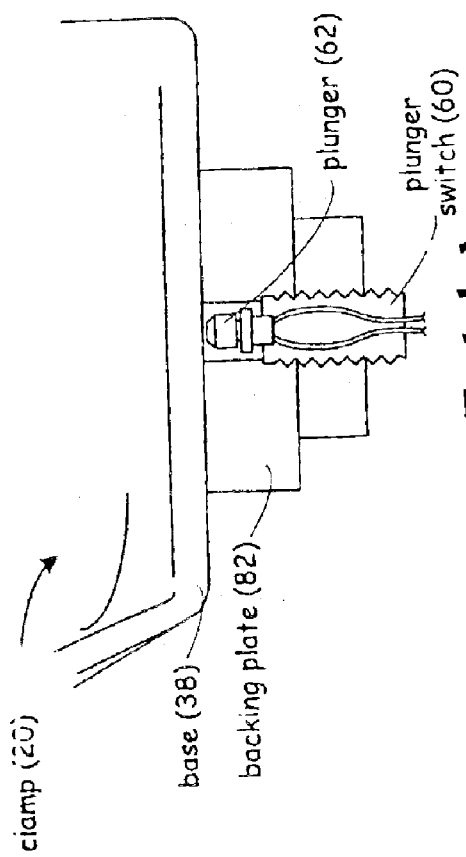
FIG. 11A discloses a second embodiment of a plunger switch assembly for use in the hitch Locking mechanism of the present invention, the plunger switch assembly abutting the undersurface of the Pentel-type clamp of FIG. 2B, the plunger switch assembly being in the armed condition, and FIG. 11B discloses the plunger switch of FIG. 11A in the alarm condition.
Figure 11B:
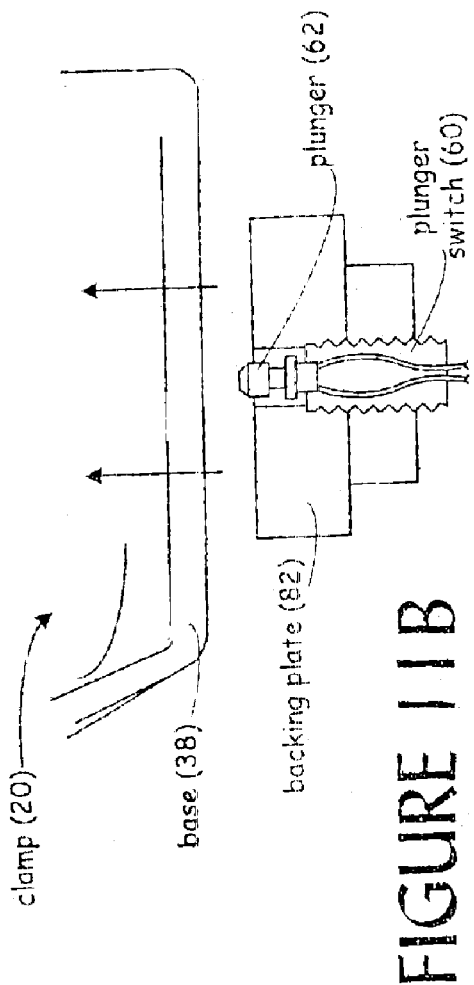

FIGS. 10B and 10C depict one preferred embodiment of a unique alarm system for hitch locking mechanisms of the present invention for a drop-ball-type hitch as depicted in FIG. 10A. The hitch mounting is secured to a towing vehicle. The hitch mounting has a recess. The hitch mounting includes a plunger switch (60). The plunger switch (60) is disposed within the recess. A plunger switch (60) is a small button-like device that is spring Loaded. The plunger switch (60) has an armed condition (FIG. 10B) and an alarm condition (FIG. 10C). Also, the principles of the plunger switch configuration of the present invention depicted can readily be adapted for other types of hitch designs. The plunger (62) is mounted so that the switch is armed once the hitch is secured to the towing vehicle. The switch moves into an alarm condition whenever the hitch is removed from towing vehicle. The plunger switch (60) is secured to a backing plate. The plunger switch (60) is installed so that the axis of the plunger (62) is aligned with the axis of the drawbar movement within the receiver tube (81). The drawbar (72) is initially inserted into the receiver tube (81). The holes in the drawbar (72) are the aligned with the holes in the receiver tube (81). Then, the plunger switch (60) is inched forward into the backing plate until resistance is achieved—the resistance indicates the plunger (62) has met the drawbar end cover (73) and the plunger (62) is being pushed inward. Such plunger switches are commercially available from Sentrol Industrial a division of General Electric (i.e.—Model# 3010)

The armed condition is set once the hitch is secured to a hitch mount, the hitch mount being securely attached to the towing vehicle. The switch is in the alarm condition when the hitch has is withdrawn from the receiver tube (81). The hitch drawbar (72) is mounted onto the towed vehicle, and the hitch drawbar (72) includes a flat surface. The flat surface is a push rod actuator for the plunger switch (60). The flat surface contacts the plunger switch (60) when the drawbar (72) is mounted into the hitch mounting. The plunger switch (60) becomes engaged when the flat surface of the hitch drawbar (72) contacts the plunger switch (60). Withdrawal of the hitch drawbar (72) from the recess of the hitch mounting actuates the plunger switch (60) causing an alarm condition. Further examples of plunger switches can be found in U.S. Pat. No. 5,817,997 (Wernig) and German Publication DE 19532523 (Ebert) The hitch mounting includes a plunger switch (60). The plunger switch (60) is disposed with the recess. The plunger switch (60) has an armed condition (FIG. 11A) and an alarm condition (FIG. 11B).

A unique alarm system for hitch locking mechanisms of the present invention is shown in FIGS. 2B and 2C (for a Pentel-type hitch). The hitch mounting is secured to a towing vehicle. The hitch mounting has a recess. The hitch mounting includes a plunger switch (60). The plunger switch (60) is disposed within the recess. A plunger switch (60) is a small button-like device that is spring loaded. The plunger switch (60) has an armed condition (FIG. 2B) and an alarm condition (FIG. 10C).

Figure 12A:
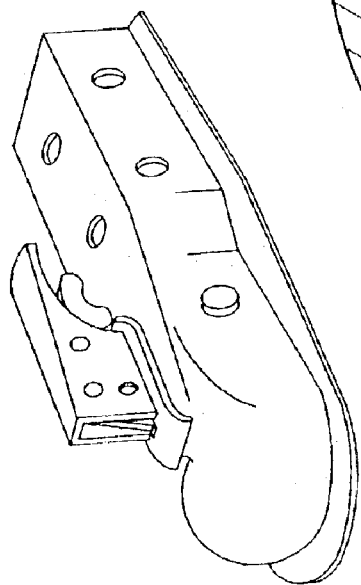
FIG. 12A discloses a trailer hitch coupler and FIG. 12B discloses a third embodiment of a plunger switch assembly for use in the hitch locking mechanism of the present invention, the plunger switch assembly abutting the top of the ball mount, the plunger switch assembly being shown in the armed status (with the alarm status in phantom).
Figure 12B:
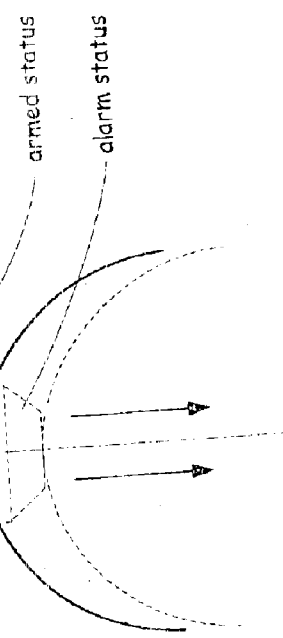

FIG. 12A discloses a trailer hitch coupler as sold by Reese and designated by them as a Fas-Lok® coupler for a trailer hitch. FIG. 12B discloses a third embodiment of a plunger switch assembly for use in the hitch locking mechanism of the present invention, the plunger switch assembly abutting the top of the ball mount, the plunger switch assembly being shown in the armed status (with the alarm status in phantom). Also, the principles of the plunger switch configuration of the present invention depicted can readily be adapted for other types of hitch designs.

Throughout this application, various patents and publications are referenced by number. The disclosures of these documents in their entireties are hereby incorporated by reference into this specification in order to more fully describe the state of the art to which this invention pertains.

It is evident that many modifications, and variations of the hitch locking mechanism of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

I claim:

1. An apparatus for securing a towing vehicle to a towed vehicle, the apparatus comprising:

a. a shank assembly including a shank, the shank being elongated and having a shank axis, the shank having a ball mount at one shank end and a shank fastener at the other shank end, the shank assembly enabling secure retention of the ball mount relative to a clamp member, the towed vehicle being attachable to the ball mount; and b. the clamp member for secure attachment to the towing vehicle, the clamp member including a base, an arm, and a jaw, the jaw being attached to the base, by a pivotal coupling, the clamp member having an inside and an outside surface, the jaw having an upright position and an extended position relative to the base;

whereby the jaw has a jaw extension, the jaw extension including a coupling that enables an engaged and a disengaged position of the jaw extension relative to the base, the coupling being in the engaged position relative to the base when the jaw member is in an upright position, the coupling enabling secure retention of the jaw relative to the base whenever a vehicle is to be towed by the towing vehicle; and whereby the shank assembly has a collar, the shank assembly further including a first ballast, the first ballast being concentric with the collar and snugly fitting about the collar, the first ballast abutting the inside surface of the clamp arm, and the shank assembly further including a second ballast, the second ballast abutting the outside surface of the clamp arm.

2. The apparatus of claim 1, wherein the shank includes an opening, the opening being normal to the axis of the shank.

3. The apparatus of claim 2, the shank assembly further comprising a sleeve, the sleeve fitting loosely about and surrounding a portion of the shank, the sleeve enabling rotation of the ball mount when the shank assembly is secured within the clamp arm.

4. The apparatus of claim 1, wherein the shank assembly includes a stop, the shank fastener when secured tightly about the shank abutting the stop, the distance between the first ballast and the tightly secured shank fastener being slightly greater than the width of the clamp arm.

5. The apparatus of claim 1, wherein the jaw includes a slight taper, and the shank includes a slight taper, the jaw taper and the shank taper mating when the shank is in the engaged position.

6. The apparatus of claim 1, wherein the jaw includes an opening, the shank includes a jaw-mating opening, the jaw opening and the jaw-mating opening being normal to the axis of the shank, the jaw opening cooperative engaging the jaw-mating opening when the apparatus is in the engaged position.

7. The apparatus of claim 1, further comprising a plunger switch, the plunger switch being attached to the towed vehicle, the plunger switch being in an armed condition when the apparatus is attached to the towing vehicle.

8. An apparatus for securing a towing vehicle to a towed vehicle, the apparatus comprising:

a. a shank assembly including a shank, the shank being elongated and having a shank axis, the shank having a ball mount at one shank end and a shank fastener at the other shank end, the shank assembly enabling secure retention of the ball mount relative to a clamp member, the towed vehicle being attachable to the ball mount; and b. the clamp member for secure attachment to the towing vehicle, the clamp member including a base, an arm, and a jaw, the jaw being attached to the base by a pivotal coupling, the clamp member having an inside and an outside surface, the jaw having an upright position and an extended position relative to the base;

whereby the jaw has a jaw extension, the jaw extension including a coupling that enables an engaged and a disengaged position of the jaw extension relative to the base, the coupling being in the engaged position relative to the base when the jaw member is in an upright position, the coupling enabling secure retention of the jaw relative to the base whenever a vehicle is to be towed by the towing vehicle.

9. The apparatus of claim 8, wherein the shank assembly includes a collar, the shank assembly further comprising a first ballast, the first ballast being concentric with the collar and snugly fitting about the collar, the first ballast abutting the inside surface of the clamp arm.

10. The apparatus of claim 8, wherein the shank assembly further comprises a second ballast, the second ballast abutting the outside surface of the clamp arm.

11. The apparatus of claim 9, wherein the shank assembly further comprises a second ballast, the second ballast abutting the outside surface of the clamp arm.

12. The apparatus of claim 8, wherein the shank includes an opening normal to the axis of the shank.

13. The apparatus of claim 9, wherein the shank assembly further comprises a sleeve, the sleeve fitting loosely about and surrounding a portion of the shank, the sleeve enabling rotation of the ball mount when the shank assembly is secured within the clamp arm.

14. The apparatus of claim 8, wherein the shank assembly includes a stop, the shank fastener when secured tightly about the shank abutting the stop, the distance between the first ballast and the tightly secured shank fastener being slightly greater than the width of the clamp arm.

15. The apparatus of claim 8, wherein the jaw includes a slight taper, and the shank includes a slight taper, the jaw taper and the shank taper mating when the shank is in the engaged position.

16. The apparatus of claim 8, wherein the jaw includes an opening, the shank includes a jaw-mating opening, the jaw opening and the jaw-mating opening being normal to the axis of the shank, the jaw opening cooperative engaging the jaw-mating opening when the apparatus is in the engaged position.

17. The apparatus of claim 8, further comprising a plunger switch, the plunger switch being attached to the towed vehicle, the plunger switch being in an armed condition when the apparatus is attached to the towing vehicle.

18. An apparatus for securing a towing vehicle to a towed vehicle, the apparatus comprising:

a. a shank assembly including a shank, the shank being elongated and having a shank axis, the shank having a ball mount at one shank end and a shank fastener at the other shank end, the shank assembly enabling secure retention of the ball mount relative to a clamp member, the towed vehicle being attachable to the ball mount; and b. the clamp member for secure attachment to the towing vehicle, the clamp member including a base, an arm, and a jaw, the jaw being attached to the base by a pivotal coupling, the clamp member having an inside and an outside surface, the jaw having an upright position and an extended position relative to the base;

whereby the shank assembly has a collar, the shank assembly further including a first ballast, the first ballast being concentric with the collar and snugly fitting about the collar, the first ballast abutting the inside surface of the clamp arm, and the shank assembly further including a second ballast, the second ballast abutting the outside surface of the clamp arm.

19. The apparatus of claim 18, wherein the shank includes an opening normal to the axis of the shank.

20. The apparatus of claim 19, the shank assembly further comprising a sleeve, the sleeve fitting loosely about and surrounding a portion of the shank, the sleeve enabling rotation of the ball mount when the shank assembly is secured within the clamp arm.

21. The apparatus of claim 18, wherein the shank assembly includes a stop, the shank fastener when secured tightly about the shank abutting the stop, the distance between the first ballast and the tightly secured shank fastener being slightly greater than the width of the clamp arm.

22. The apparatus of claim 18, wherein the jaw includes a slight taper, and the shank includes a slight taper, the jaw taper and the shank taper mating when the shank is in the engaged position.

23. The apparatus of claim 18, wherein the jaw includes an opening, the shank includes a jaw-mating opening, the jaw opening and the jaw-mating opening being normal to the axis of the shank, the jaw opening cooperative engaging the jaw-mating opening when the apparatus is in the engaged position.

24. The apparatus of claim 18, further comprising a plunger switch, the plunger switch being attached to the towed vehicle, the plunger switch being in an armed condition when the apparatus is attached to the towing vehicle.

* * * * *